US005880448A

United States Patent [19]

Hetzer et al.

[11] Patent Number: 5,880,448

[45] Date of Patent: Mar. 9, 1999

[54] ELECTRONIC MANUAL POSTAGE METER MACHINE HAVING A RECHARGING AND CLEANING ADAPTER

[75] Inventors: Ulrich Hetzer; Volker Herbig; Juergen Quass, all of Berlin, Germany

[73] Assignee: Francotyp-Postalia AG & Co., Birkenweeder, Germany

[21] Appl. No.: 661,956

[22] Filed: Jun. 12, 1996

[30] Foreign Application Priority Data

Jun. 19, 1995 [DE] Germany ........................ 195 22 595.3

[51] Int. Cl.$^{6}$ ............................ G06F 17/00; G06K 15/00

[52] U.S. Cl. ...................................... 235/383; 364/464.02

[58] Field of Search .................................... 235/382, 383, 235/380, 381; 364/464.02

[56] References Cited

U.S. PATENT DOCUMENTS

| | | | |
|---|---|---|---|
| 4,123,761 | 10/1978 | Kumura et al. . | |
| 4,168,533 | 9/1979 | Schwartz . | |
| 4,300,145 | 11/1981 | van Raamsdonk . | |
| 4,412,232 | 10/1983 | Weber et al. . | |
| 4,543,589 | 9/1985 | Terasawa . | |
| 4,813,912 | 3/1989 | Chinkneas et al. | 364/464.02 |
| 4,864,506 | 9/1989 | Storace | 364/464.02 |
| 4,900,905 | 2/1990 | Pusic | 235/381 |
| 4,903,232 | 2/1990 | O'Connell et al. . | |
| 4,978,839 | 12/1990 | Chen et al. | 235/375 |
| 4,980,542 | 12/1990 | Jackson et al. | 235/375 |
| 5,065,000 | 11/1991 | Pusic | 235/381 |
| 5,173,862 | 12/1992 | Fedirchuk et al. | 364/464.02 |
| 5,182,582 | 1/1993 | Okamura . | |
| 5,365,044 | 11/1994 | Hesshaus . | |
| 5,606,507 | 2/1997 | Kara | 235/381 |
| 5,623,876 | 4/1997 | Murphy, III et al. | 101/483 |
| 5,666,284 | 9/1997 | Kara | 235/381 |
| 5,682,318 | 10/1997 | Kara | 235/381 |
| 5,686,713 | 11/1997 | Rivera | 235/381 |
| 5,717,165 | 2/1998 | Cohen et al. | 177/2 |

FOREIGN PATENT DOCUMENTS

| | | |
|---|---|---|
| 0 036 295 | 9/1981 | European Pat. Off. . |
| 1 566 342 | 4/1980 | United Kingdom . |

*Primary Examiner*—Le Thien Minh
*Attorney, Agent, or Firm*—Hill & Simpson

[57] ABSTRACT

An arrangement for an electronic manual franking machine having an ink printer head and having an integrated system for controlling and supplying the ink printer head includes a housing containing a first assembly composed of a carriage, an ink printer head with a replaceable ink tank, and a second assembly composed of a write-read unit for a postage credit card, a microprocessor as well as a rechargeable battery with charging terminal, and an adapter with a mains terminal and, as needed, a data terminal. The adapter includes a battery charging device and a cleaning device and is fashioned as a deposit and docking station for recharging, cleaning and sealing of the manual franking machine. The carriage is fashioned so that the recording medium is rendered taut in the printing region. The cleaning ensues by ink ejection and/or extraction into the sealing cap, by sucking the sealing cap empty with a suction pump and wiping the ink printer head at a wiper lip.

21 Claims, 11 Drawing Sheets

ELECTRONIC MANUAL POSTAGE METER MACHINE HAVING A RECHARGING AND CLEANING ADAPTER

RELATED APPLICATION

The subject matter of the present application is related to the subject matter disclosed in an application filed simultaneously herewith, assigned to the same Assignee (Francotyp Postalia AG & Co.) entitled "Arrangement For An Electronic Manual Postage Meter Machine," Hetzer, (Ser. No. 08/661,956).

BACKGROUND OF THE INVENTION

1. Field of the Invention

The invention is directed to an arrangement for an electronic manual postage meter machine (hand franking machine) with an ink-jet print head and with integrated means for controlling and supplying the ink-jet print head.

2. Description of the Prior Art

Postage meter machines of the above type can be employed everywhere where there is only low mail volume but there is a desire for a modern franking imprint.

The mechanical predecessor of such a postage meter machine is the D2 postage meter machine of Francotyp-Postalia that has been in use for many decades. This postage meter machine works without chip cards, so that the user must undertake a payment of fees at the post office, where a postal clerk directly sets the crediting system in the machine and seals it with a lead seal, as described in the instruction manual.

On the other hand, a franking tape generator system is known, as described in PCT Application WO 92/07338, with which a date a postage value and an advertizing slogan are printed on a franking tape. A printer unit, a processor system, a read-write means, an operating device and a tape supply container are arranged in a common housing. The write-read means serves the purpose of accepting postage credit cards and is connected to the processor system via information lines for the exchange of digitized data for identification, fee debiting and the individual advertizing slogan stored on the postage credit card. The digitized data of the advertizing slogan as well as monitoring and security data are likewise transmitted between the processor system and the printer unit via information and signal lines. The system can be operated independently of a network with batteries or rechargeable accumulators. For this system, the batteries must supply the energy for the printer unit as well as for the drive of the tape roll; accordingly, the batteries must be high-power batteries because the operating time would otherwise be limited. The tape supply container requires a corresponding volume. A loading of the postage meter machines at the post office is eliminated by employing postage credit cards, however, the franking tapes must be glued onto the postal matter and must be of such a nature that a re-use or further use is precluded.

A franker for printing a value imprint postal matter with an ink-jet printer means is also known, see German OS 27 01 072. The pattern of the postage value imprint is composed of successive sub-patterns. The franker contains an electronic control means for the ink-jet printer means and the control sequence thereof, a clock circuit for clocking the logic circuit during the course of printing as well as a postage fee memory. The franker is provided with a microcomputer operating on the basis of its own power supply whose clock circuit is actuated by a detector means. The detector means serves the purpose of identifying the relative speed of the franker with respect to the postal matter and supplying this information to the clock circuit as control signals. The clock circuit generates clock signals for the logic circuit of the microcomputer proportional to the relative speed. The ink-jet printer means successively emits the respective sub-patterns of the postage value imprint in the clock of these clock signals when the franker is moved over the postal matter. Two parallel axles each having two guide rollers at the ends serve to facilitate the motion. Eleven nozzles are arranged in the ink jet printer means in a row transverse relative to the moving direction of the franker.

The detector means is constructed as an optical monitor. A light source is the form of a light-emitting diode is focussed onto the region of the recording medium into which the ink drops are ejected from the ink jet printer means. The reflected light is supplied to a phototransistor via an optical probe composed of fibers. The microcomputer is programmed such that an ink drop is ejected every time the printer means is actuated. In order to permit a continuous optical scanning, a control pattern in the form of a line of printed dots is generated in addition to the actual franking imprint, the former underlining the latter. The monitor senses this line. The phototransistor reacts to changes from printing dot to free (unprinted) region in this control line and generates a pulsating signal that is forwarded to the microcomputer, the frequency of this pulsating signal thus being determined by the speed with which the monitor moves over the control line.

A rechargeable nickel-cadmium battery serves as the power supply.

Except for the nozzle discharge area, the housing of this known franker is closed with a cap that is displaceable corresponding to the stroke of an actuation switch but that can only be removed by an authorized person. This ensues in a postage distribution center when the stored postage has been largely used. The franker contains a number of input connections that are all accessible when the cap is removed. These input connections are composed of two sockets that are connected to the microcomputer, two sockets from the input of the power supply for the purpose of connection to a charging source, and a refill means for the ink reservoir.

After removal of the cap, the franker is plugged into a central location that has a main input plug that is connected to a charging means for the power supply, to an ink supply and a postage output computer. In one procedure, thus, the battery is recharged, additionally purchased postage is entered into the memory register of the microcomputer and the ink reservoir is filled.

It is obvious that the postage distribution center must usually be visited in order to recharge the battery, rather than for replenishing postage credit. If the hand franker is to meet moderns demands—printing not only a value imprint but an advertizing slogan as well—, then an ink printer head having 192 nozzles is required. Such an ink print head has a corresponding high energy consumption for setting the required operating temperature and for ink ejection which, if employed in a hand franker, would drain the battery long before the usual time for replenishing postage. Moreover, such ink print heads require an adapted cleaning mechanism that is entirely lacking in a hand franker. Since the nozzle area is always open, there is the risk during pauses in operation that the ink in the nozzle will dry and plug the nozzles. When the hand franker is mover over the postal matter on four parallel wheels running in the same direction, there is the risk that convexity and slippage arise in the recording medium and the print quality thus suffers. Determining the relative speed with bright-dark differences on the recording medium is susceptible to disruption dependent on the color of the recording medium, more so given a dark medium, less so given a light medium.

It has already been proposed in general for ink jet printers to attach an extraction means for cleaning the ink printer head to the latter itself, see German OS 27 25 761.

It has likewise been proposed for ink printers with a moving ink printer head that the nozzle discharge area be able to be covered in every position thereof, see German 29 19 727. To this end, a seal means that has a cover pad is moved together with the ink printer head on the basis of a mount. The seal means is displaceable from the outside in a position that makes the nozzle discharge area tight or releases it, this displacement occurring via a rocker extending over the entire range of motion of the ink printer head and via a coupling part placed against the mount. The nozzle area has a salient, all-around collar; the seal means is lowered thereinto. A cavity which is filled with ink by capillary action from the nozzles is formed in this way. This arrangement is specifically adapted to office printers, is relatively complex and the cleaning effect is achieved only with the cover cushion pad.

For intensifying the absorbency of an ink-absorbing means within a cap, another solution—see German OS 32 37 411—bring a suction line to the back side of the ink-absorbing means, an external suction pump being connected to the other end thereof. The ink stored in the absorbing means is eliminated in this way at the same time.

Finally, a ink jet recording device having at least one ink printer head and a regeneration means is also known from German OS 37 36 916.

In this device, a carriage with the ink printer heads is moved from a recording region into a regeneration and cleaning region. During the motion, the nozzle surface sweeps past an elastic wiper lip and is roughly cleaned in this way. A regeneration means having a cover housing is mounted against the ink printer head in the regeneration region, whereby each nozzle row, or each ink printer module given multi-color heads, is separately covered. The regeneration means operates with a suction pump. Ink, ink residues and air bubbles are suctioned off by under-pressure. This solution is also specifically tailored to an office printer.

SUMMARY OF THE INVENTION

A goal of the invention is to increase the dependability and the field of employment of manual franking machines having ink printer heads.

An object of the present invention is to provide a solution for a hand franking machine that meets modern demands for postage and slogan printing and for which a regeneration—reloading postage, recharging the battery and refilling ink—in a central means such as the post office is eliminated. In particular, an internal cleaning possibility should be present for the ink printer head and the latter should also be protected against drying out during pauses in use.

The above object is achieved in accordance with the principles of the present invention in an electronic manual franking machine having an ink printer head and an integrated system for controlling and supplying the ink printer head, with the ink printer head being a part of a first assembly, contained in a housing, which also includes a carriage and a replaceable ink tank. The housing also contains a second assembly including a write/read unit for a postage credit card, a microprocessor 320 and a rechargeable battery with a charging terminal and an adapter for mating with a mains terminal and, as needed, a data terminal. The adapter includes a battery charging device and a cleaning device and has a deposit and docking (mating) station for simultaneously recharging, cleaning and sealing the manual franking machine. The carriage is constructed so that the recording medium is maintained taut in the printing region. Cleaning ensues by ink ejection and/or extraction into the sealing cap, by withdrawing ink from the sealing cap by suction with a suction pump, and wiping the ink printer head with a wiper lip.

The manual franking machine according to the inventive arrangement is protected against data manipulations by operation with a data input means such as a postage credit card; additional security sealing is also possible. European Application 0 566 225 describes further possibilities for data input into a postage meter machine, which therefore need not be discussed further herein. Due to the inventive combination of an ink printer head with a replaceable ink tank, a cleaning part and a sealing cap as well as a rechargeable battery with a charging terminal, the user has on site capability to keep the hand franking machine always ready to operate.

In printers and postage meter machines that are implemented as a console unit, relatively great outlay is incurred in order to achieve a defined transport and a defined position of the recording medium relative to the ink printer head. Except for the matching between printing speed and moving speed, such goals seem unachievable at first sight for a hand franking machine. Keeping the recording medium taut in all directions within the printing region is achieved for the first time with the inventive fashioning of the carriage and the drive as well as the design and positioning of the wheels.

Fastening the ink printer head to a lever that is resiliently seated in a region between two detents and glides on the recording medium with a spacer nose constantly assures a constant spacing between the nozzle apertures and the recording medium.

Given adherence to the emplacement mark, a pre-smoothing of the recording medium and a reliable mechanical contact between the two is achieved by the uses of only one drum-shaped front wheel is provided. The travel rate can thus be acquired with adequate precision by the incremental sensor connected to the front wheel.

A centrifugal brake is provided which prevents the maximally allowed travel speed from being exceeded.

The housing of the hand franking machine is resiliently seated on the carriage and is also ergonomically designed so that flexible operation is possible.

Cleaning of the ink printer head ensues by means of ink ejection through the write nozzles and/or extraction of ink into the sealing cap in the adapter, whereby the ink is extracted from the sealing cap into an extraction tank with any suitable suction pump. The cleaning procedure can generally be limited to the time in the printing pauses.

The wiper lip serves for rough cleaning of the nozzle surface in a known way. The resilient mounting of the sealing cap with the allocated guide thereof in the housing of the adapter always secures a defined position between the ink printer head and the sealing cap and also assures adequate tightness. A good detent in the limit position is achieved by the combination of stop edge, guide strip with bevels and counterspring in the housing of the adapter and detent at the carrying lever for the ink guide printer head.

This arrangement—in modified form—is also advantageously suited for use as a product labeling device. Instead of the postage credit card with debiting of the postage value, a corresponding chip card with product data and a piece count can be utilized.

DESCRIPTION OF THE PREFERRED EMBODIMENTS

Figure 1:
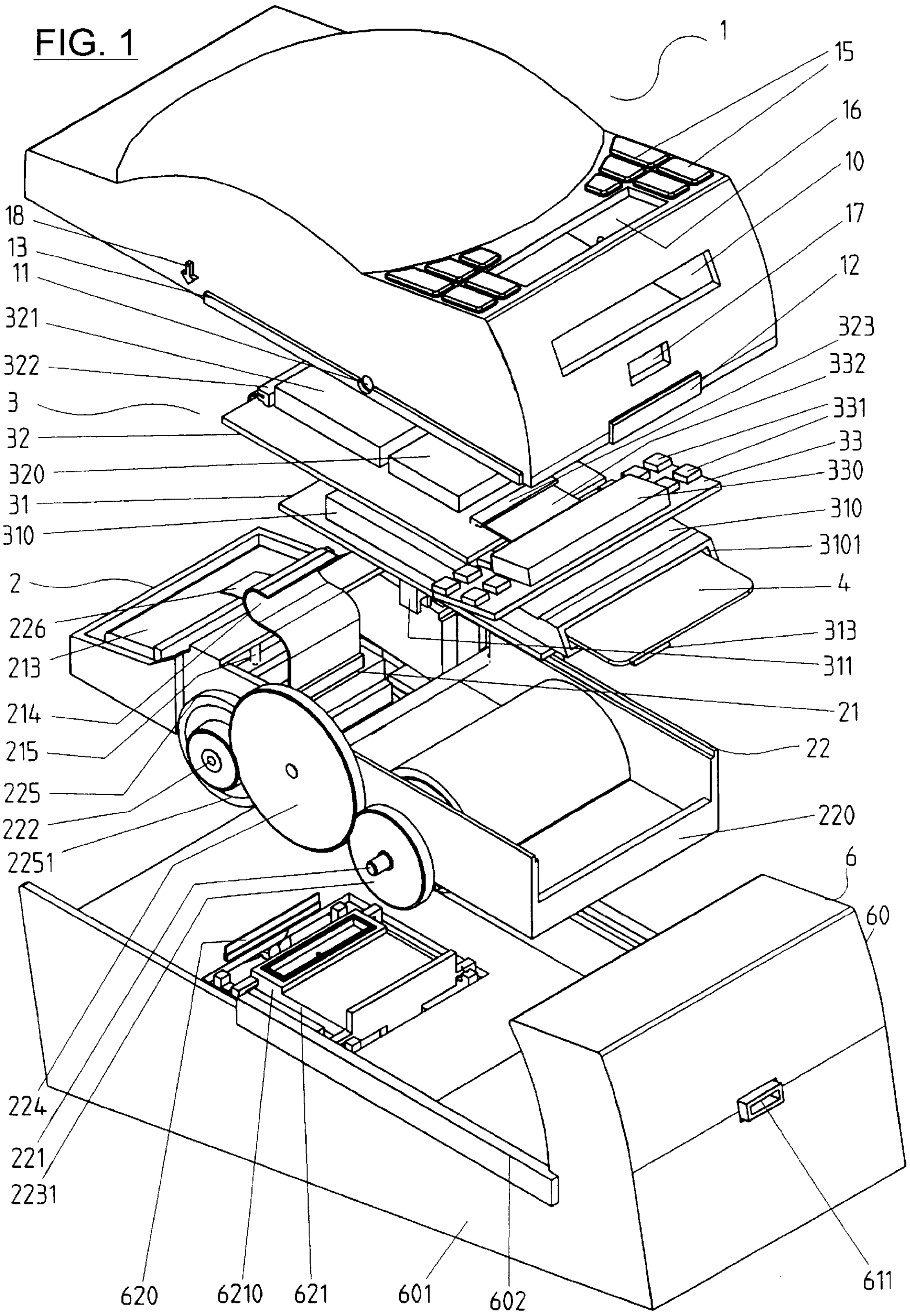
FIG. 1 is an exploded view of an electronic manual franking machine constructed in accordance with the principles of the present invention.

As shown in FIG. 1, an electronic manual franking machine is composed of a housing 1, a first assembly 2 and a second assembly 3. The second assembly 3 is put in place onto the first assembly 2, and the two assemblies are arranged together in the housing 1. When arranged in this manner, the first assembly 2 and the second assembly 3 are insertable into a receptacle of an adapter 6, which is discussed in more detail below.

The housing 1 is designed so as to be ergonomically adapted to the human hand. The housing 1 includes a slot 10 for the introduction of a postage credit card, i.e., a card of a known type having paid-for postage, and possibly other information, stored thereon. The housing 1 also has openings 11 for a front axle 221.

The housing 1 has a number of operating keys 15 and an opening 16 for receiving the visible portion of a display 330. The housing 1 has an opening 17 for a charging terminal, a front and back guide mark 12, and a placement mark 18 for franking.

A first assembly 2 is contained in the housing 1. The first assembly 2 includes an ink printer head 21 with an ink tank 213 connected thereto by hose 215. The first assembly 2 also includes a carriage 22 having a carriage frame 220, the aforementioned front axle 221 with two drive wheels 2231, and two coupling wheels 224, and two rear axles 222 each having a rear wheel 225 and a driven wheel 2251.

The housing 1 is resiliently seated on the carriage 22 by means of a spring 226.

The housing 1 also contains a second assembly 3. The second assembly 3 includes a first circuit board 31 with a write-read unit 310 and a postage credit card receptacle 3101 in registry with the slot 10 in the housing 1. The first circuit board 31 also carries a sensor 311 for acquiring the speed of movement of the machine, and a charging terminal 313 for an external charging means, which may optionally also include a data terminal.

The second assembly 3 also includes a second circuit board 32 carrying a microprocessor 320 and a rechargeable battery 321, as well as a third circuit board carrying the aforementioned display 330 and switching elements 331.

The ink print head 21 is connected via a connecting cable 214 to the second circuit board 32 that is provided with a plug-type connector 322 for this purpose.

The third circuit board 33 is connected via a connecting cable 332 to the second circuit board 32 that is provided with another plug-type connector 323 for this purpose.

Figures 2, 8B:
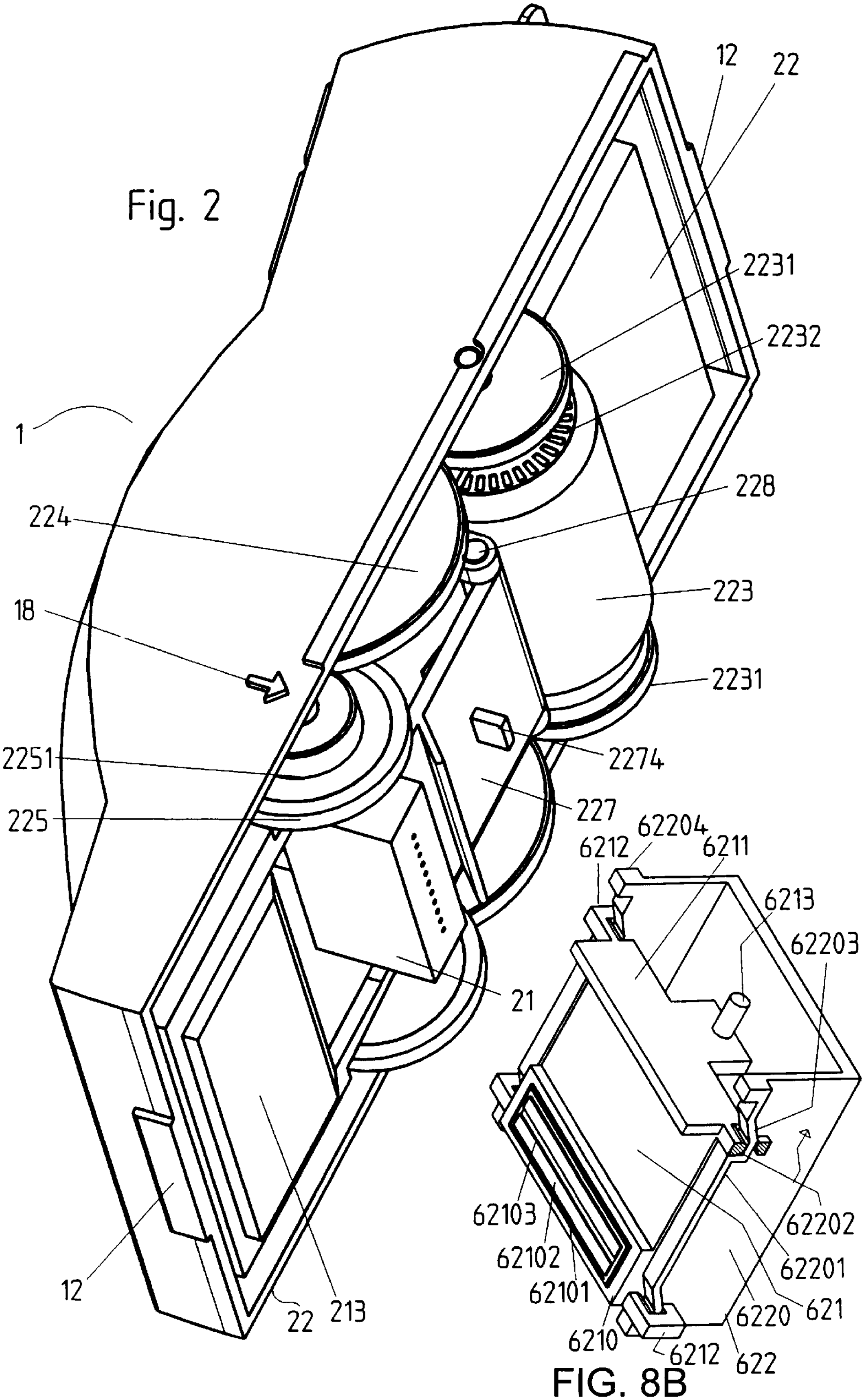
FIG. 2 is a perspective view of the manual franking machine constructed in accordance with the principles of the present invention from below with details of the sealing cap.

As can be seen from the view of FIG. 2, the ink print head 21 is secured to a lever 227. The lever 227 is pivotable around an axis 228 and is resiliently seated. The lever 227 has a downwardly directed nose 2274 for a cleaning carriage 621 located in the adapter 6.

A front wheel 223 is mounted on the front axle 221, the front wheel 223 being in the form of a cylindrical frictional wheel with an incremental sensor 2232, which emits an electrical signal to the sensor 311. The traveling speed is thereby acquired by measuring the rotation of the front wheel 223, independently of the nature of the recording medium, and the operation of the ink printer head 21 can be controlled in a corresponding manner by the microprocessor 320.

Figure 3:
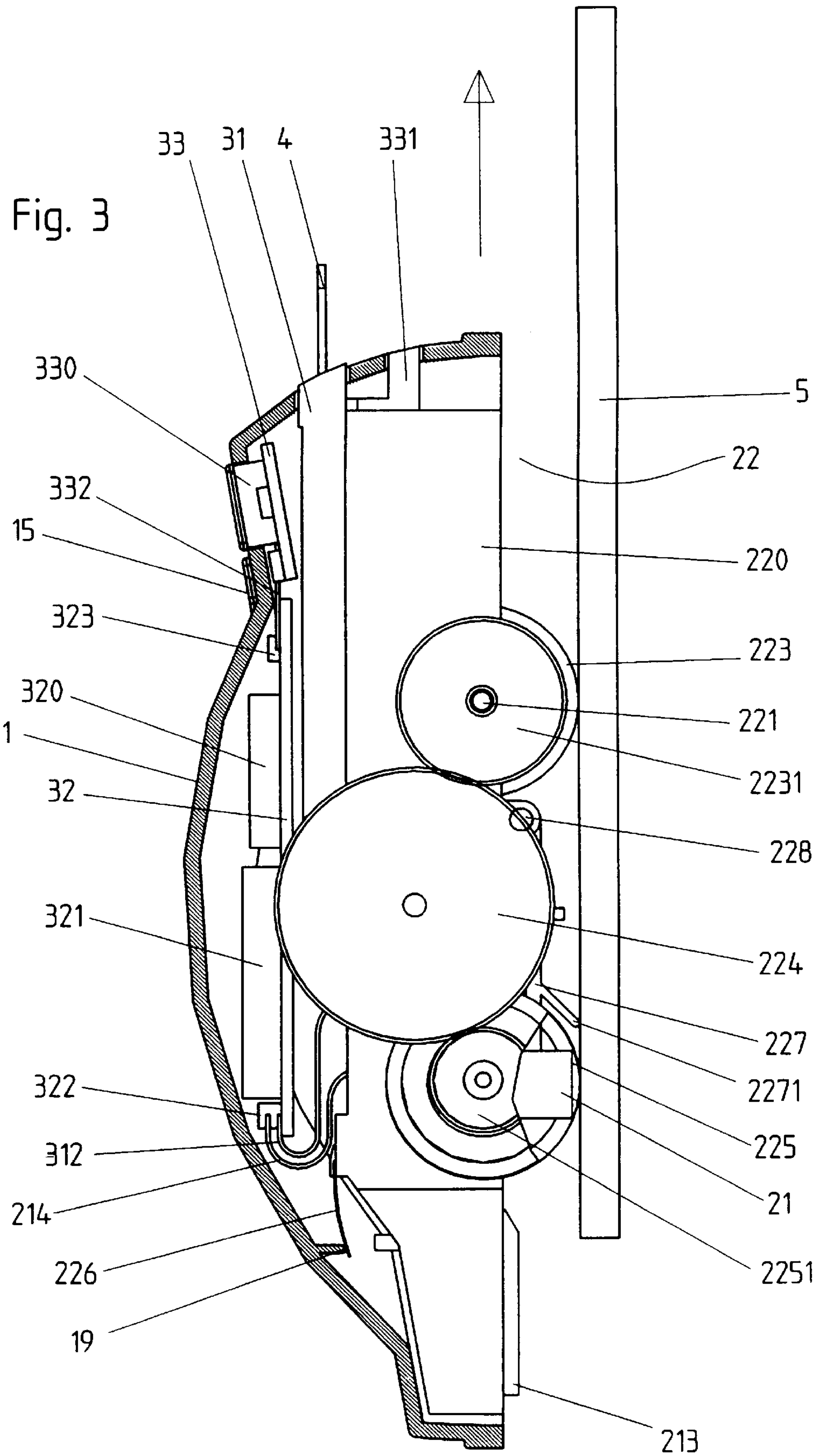
FIG. 3 is a longitudinal section with the section through the housing of the hand franking machine constructed in accordance with the principles of the present invention.

The coupling of the drive wheels 2231 to the driven wheels 2251 via the two coupling wheels 224 can be seen in FIG. 3. All wheels are preferably gear wheels, with the gear ratio of the drive wheels 2231 to the driven wheels 2251 being greater than one. The rear wheels 225 consequently turn somewhat faster than the front wheel 223; the result being that the recording medium 5 is pulled toward the back. In order to maintain the recording medium 5 taut only in the printing region, the rear wheels 225 have a lower coefficient of friction at the outside circumference than the front wheel 223; such as by being smoother.

It may also be seen how a constant spacing of the ink print head 21 from the recording medium 5 is always maintained. To this end, a spacer nose 2271 that glides along the recording medium 5 given movement of the manual franking machine thereover is applied to the lever 227 that carries the ink printer head 21.

A detent 19 against which the spring 226 presses in a friction-actuated manner is applied to the housing 1, the spring 226 being attached to the carriage frame 220. In this way, the housing 1 is seated on the carriage 22 so as to be resiliently rotatable around the axis 221. A lock with a possible seal may be provided.

From the plug-type connector 322 on the second circuit board 32, the connecting cable 214 proceeds to the ink printer head 21 and the connecting cable 312 proceeds to the first circuit board 31.

Figure 4:
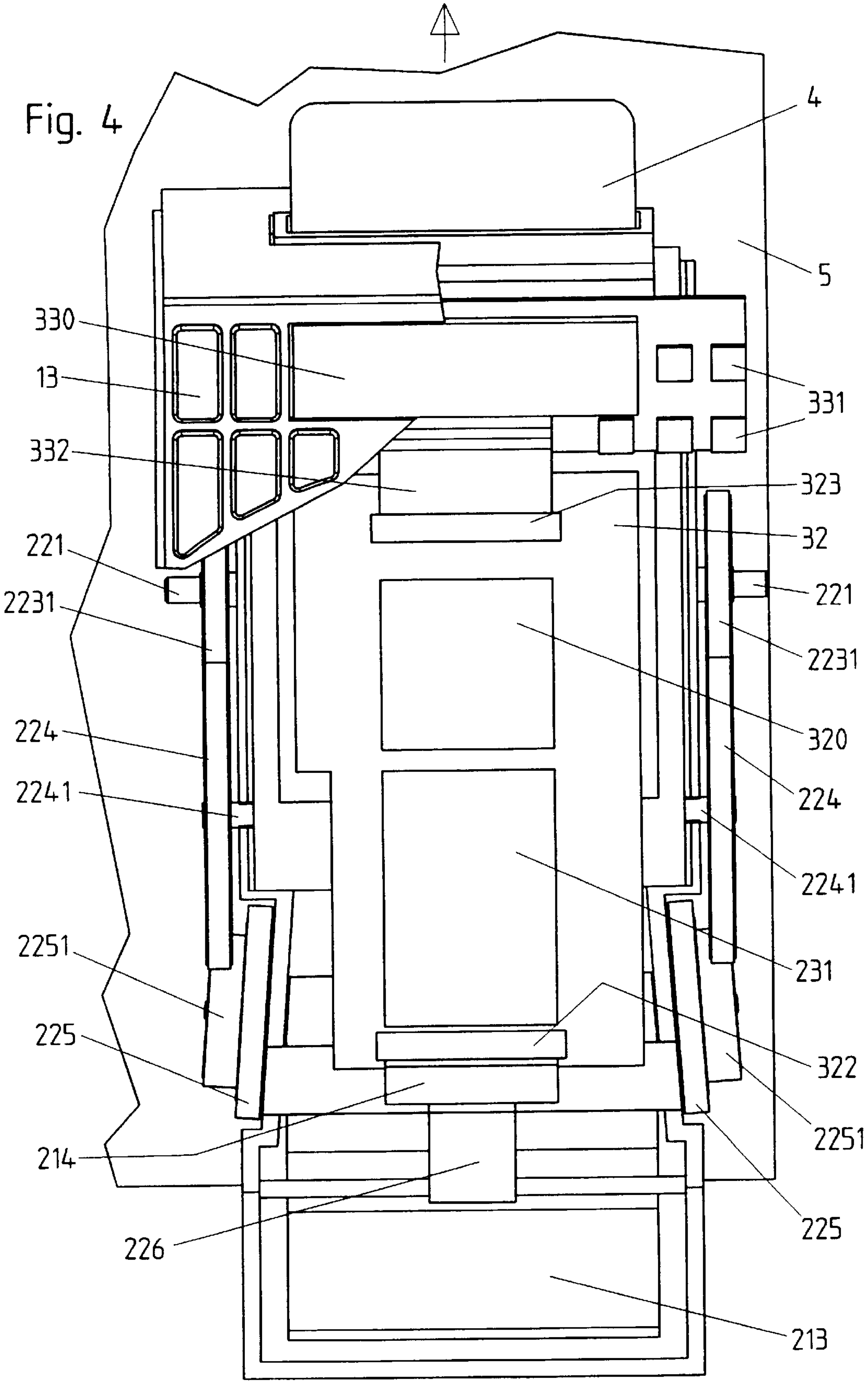
FIG. 4 is a plan view onto the carriage of the partly cutaway housing of the hand franking machine constructed in accordance with the principles of the present invention.

FIG. 4 shows that the rear wheels 225 are set inwardly in the traveling direction. The result is that the recording medium is also maintained taut in transverse direction when the manual franking machine moves thereover.

Figure 5:
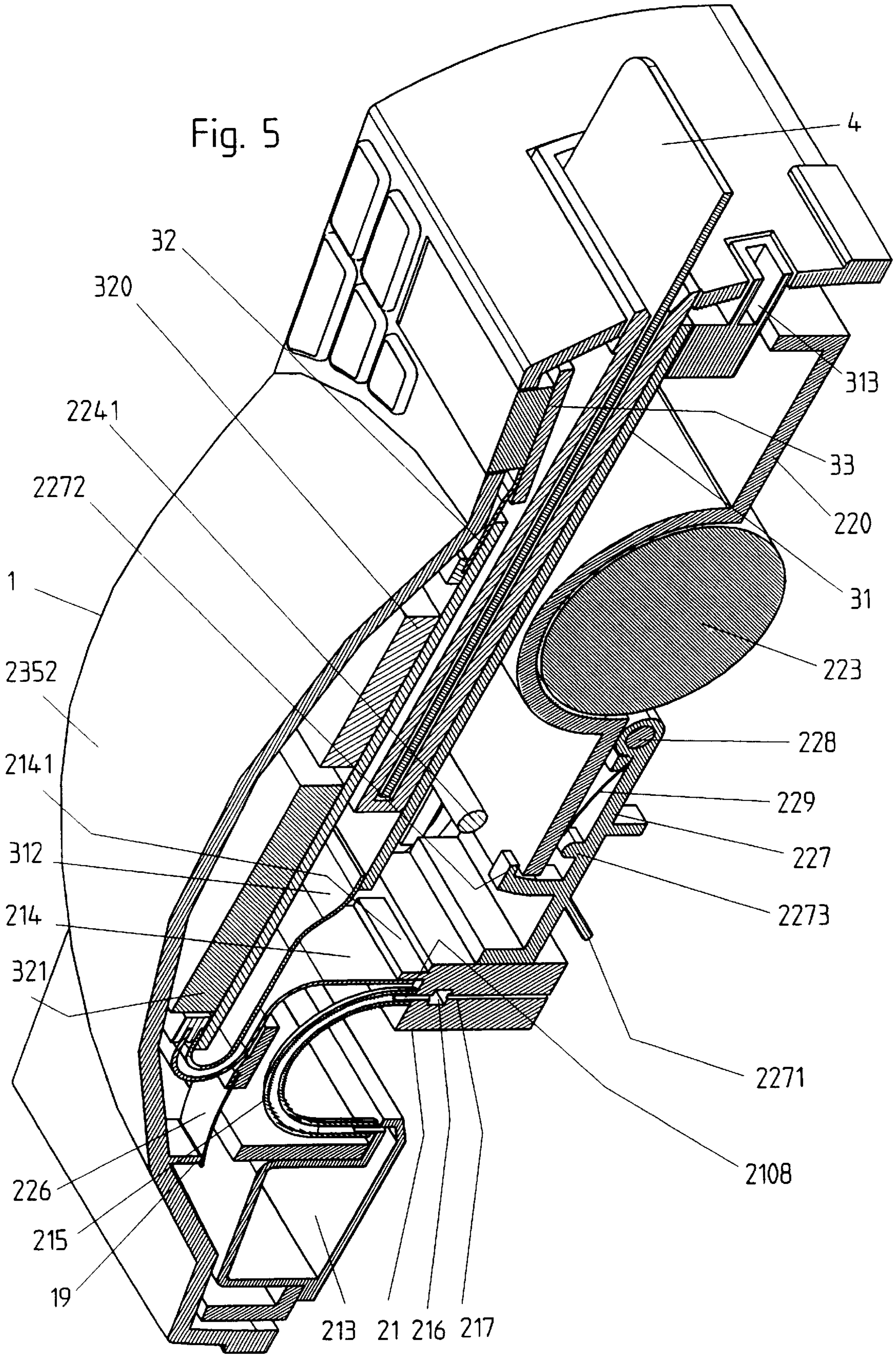
FIG. 5 is a perspective view onto a longitudinal section in the region of the ink delivery channel in the manual franking machine constructed in accordance with the principles of the present invention.

FIG. 5 shows how the ink printer head is rotatably resiliently seated so that a distance compensation to the recording medium is always possible. The lever 227 which is pivotable around the shaft 228 has a stop nose 2272 and a stop nose 2273. The stop nose 2272 is hook-shaped and engages behind an edge of the carriage frame 220. The stop nose 2273 is directed toward the base of the carriage frame 220. A spring 229 is secured to the lever 227 in the proximity of the pivot point thereof and lies non-positively (unattached) against the base of the carriage frame 220. As a result thereof, the stop nose 2272 comes to be seated against the aforementioned edge of the carriage frame 220. The stop nose 2273 is then at its maximum distance from the base of the carriage frame 220. The maximum range of swivel for the ink printer head 21 is defined by this distance at the same time, corresponding to the lever spacing. When the manual franking machine is put in place on the recording medium 5, the stop nose 2271 presses the lever 227 opposite the action of the spring 229. The limit position is when the stop nose 2273 lies against the carriage frame.

The connection from the ink tank 213 via the ink hose 215 to the delivery channel 216 and to an ink channel 217 of the ink printer head 21 may also be seen in the sectional view. The ink pressure chambers have been omitted for clarity.

The connection 2141 at the ink printer head 21 for the connecting cable 214 and the shaft 2241 for the coupling wheels 224 can also be seen in the sectional view.

Figure 6:
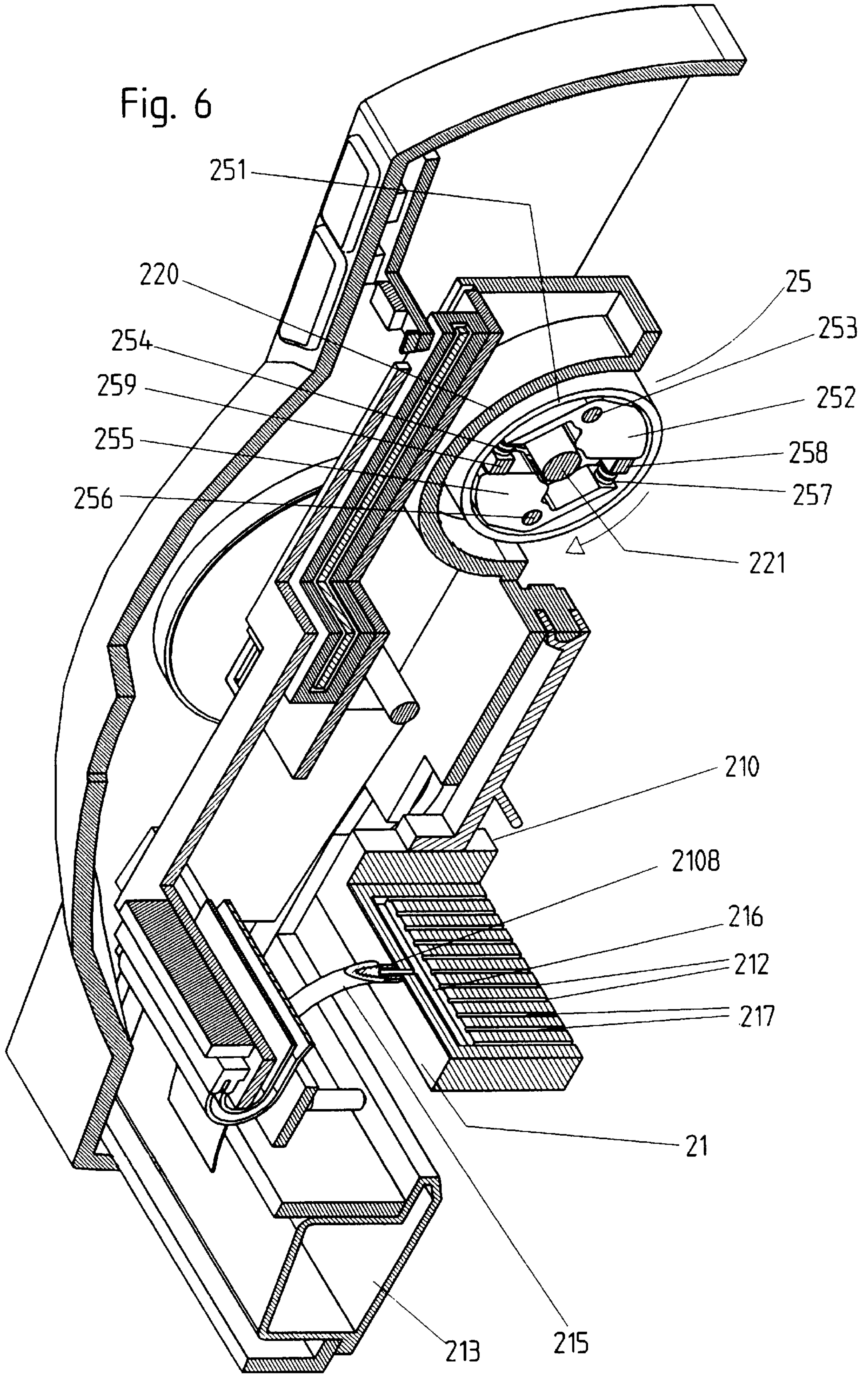
FIG. 6 shows perspective and partly sectional views for an ink printer head, and centrifugal brake constructed in accordance with the principles of the present invention.

The views in FIG. 6 show details of a centrifugal brake 25 as well as further details of the ink printer head 21.

The centrifugal brake 25 is seated on the front axle 221 and is constructed in a known way. The housing 251 is formed into the carriage 220. The centrifugal brake 25 is composed of a first brake shoe 252 seated on an axle 253 with a detent 258, a second brake shoe 255 seated on an axle 256 together with a detent 259, as well as two compression springs 254 and 257. The compression spring 254 is arranged between the detent 259 and a leg of the brake shoe 252, so that the other leg of the brake shoe 252 is pressed against the detent 258 by the spring power. Analogously, the compression spring 257 is arranged between the detent 258 and a leg of the brake shoe 255, so that the other leg of the brake shoe 255 is pressed against the detent 259. When an allowed, maximum speed is exceeded, the centrifugal forces acting on the brake shoes 252 and 255 become larger than the spring powers, causing the brake shoes 252 and 255 to press against the wall of the housing 251 and thus brake the manual franking machine.

The sectional view of the ink printer head 21 shows the ink delivery via the connection 2108 for the ink hose 215 from the ink tank 213. The ink first flows into the delivery channel 216 and from there to the nozzle apertures 212 via the ink channels 217.

Figure 7:
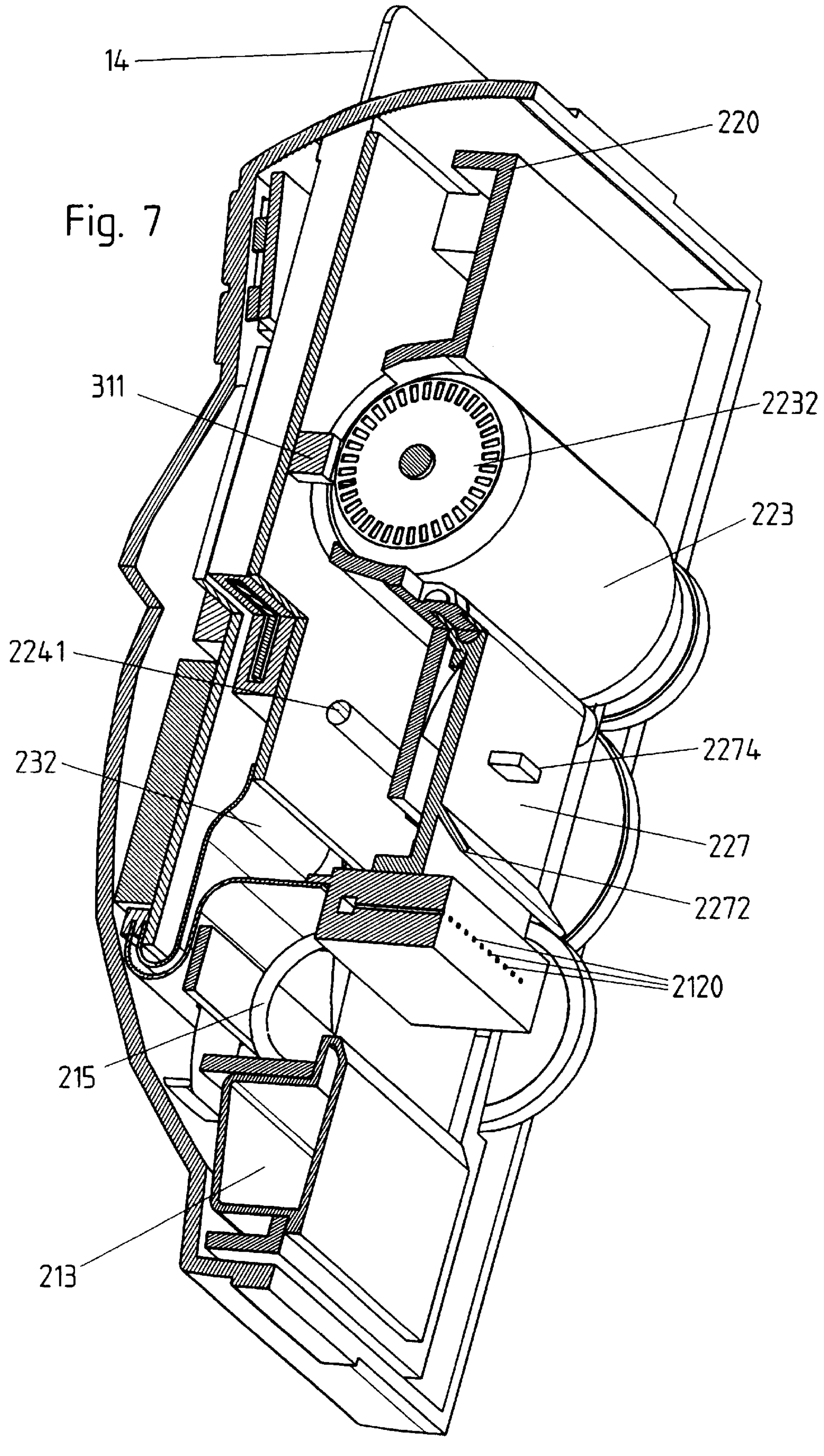
FIG. 7 is a perspective view of the manual franking machine of the invention from below, with a longitudinal section in the region of the incremental sensor.

FIG. 7 shows the arrangement of the sensor 311 for the incremental sensor 2232 that is implemented as an integral component part of the front wheel 223. The sensing grid of the incremental sensor 2232 is as finely subdivided as required by the drive for the ink printer head 21 so that printing and transport speed can be matched to one another.

Figure 8A:
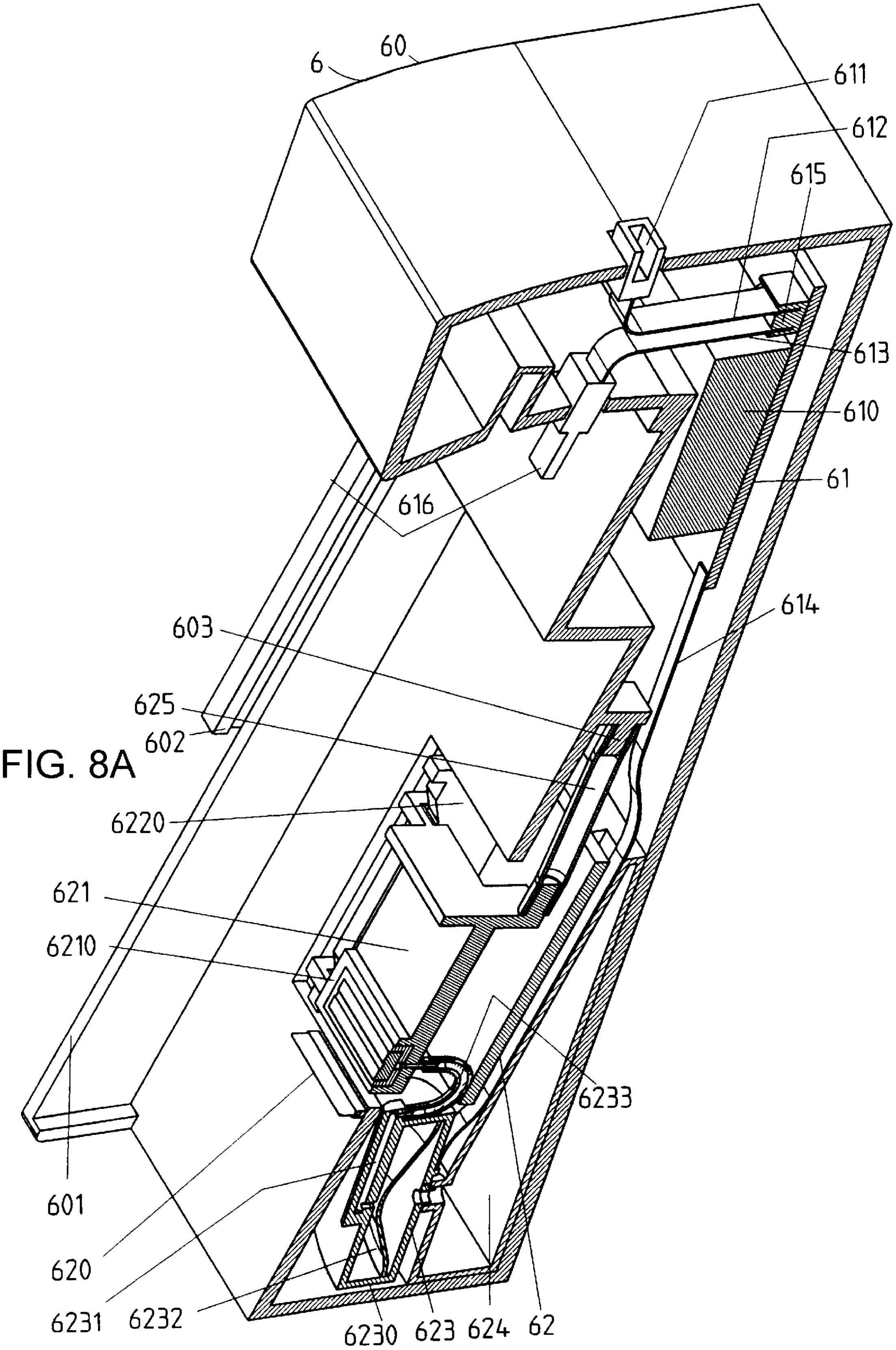
FIG. 8 is a perspective view onto a longitudinal section through the adapter in the region of the extraction channel and shows details regarding the sealing cap in the manual franking machine of the invention.

FIG. 8 shows the structure of the adapter 6. The adapter 6 is basically divided into two regions: a first region for the docking of the ink printer head 21 and a second region for the electrical coupling of the manual franking machine.

The first region contains a cleaning device 62 with a wiper lip 620, a sealing cap 6210, a suction pump 623 and an extraction tank 624.

The second region contain a battery charging device 610, an outside terminal socket 611 for mains and data, a modem (not shown) as needed and a plug 616 for the electrical connection—battery feed, control data exchange—to the manual franking machine.

The cleaning device 62 includes a cleaning carriage 621 and a receptacle part 622 for the cleaning carriage 621. The receptacle part 622 is introduced into a recess (not referenced in detail) in the housing 60 of the adapter 6.

With guide hooks 6212 at its ends, the cleaning carriage 621 surrounds the guide strips 62201 of the sidewalls 6220 of the receptacle part 622. The guide strips 62201 are fashioned such that the cleaning carriage 621 is provided with both a height adjustment and a defined detent in the limit positions when the cleaning carriage 621 slides thereon. To this end, the guide strips 62201 have ends provided with step-shaped detents 62202, bevels 62203 as well as peg-shaped limit stops 62204.

At one end, the cleaning carriage has a plate-shaped detent 6211 and a peg 6213 projecting therefrom. The detent 6211 serves as dog when the manual franking machine is inserted into the adapter 6.

The peg 6213 serves as receptacle for a compression spring 625 whose other end is seated at a peg 603. The peg 603 is applied to the housing 60 of the adapter 6. The sealing cap 6210 contains an all-around seal 62101, and a suction pad 62102 that has a channel 62103. The channel 62103 serves to uncover a nozzle row when the ink printer head 21 is docked. A corresponding number of channels are provided for a given number of nozzle rows. Via a connecting piece 62104 and a hose 6233, the sealing cap 6210 is connected to the extraction channel 6231 in the housing 6230 of the suction pump 623 and thus is connected to the suction pump 623 (also see FIG. 9). The suction pump 623 operates with a diaphragm 6232, however, any other arbitrary suction pump could also be employed. The housing 6230 is seated directly on the extraction tank 624 and is flanged thereto. The drive of the suction pump 623 ensues via a connecting cable 614 that is connected to the circuit board 61 and to control electronics that are not shown in detail. A plug-type connector 615 is secured on the circuit board 61. A connecting cable 612 leads therefrom to the outside terminal socket 611 and to a connecting cable 613 proceedings therefrom to the plug 616 for the manual franking machine. The cleaning procedure is triggered by actuation of the keys 15 of the manual franking machine.

The housing 60 of the adapter 6 is fashioned trough-like in its upper part by an upward extension of the sidewalls 601. A first pre-positioning of the manual franking machine relative to the adapter 6 is thus achieved. In order to then achieve a further, precise guidance thereof, guide rails 602 along which the manual franking machine is guided by means of its glide rails 13 are also provided at the sidewalls 601.

Figure 9:
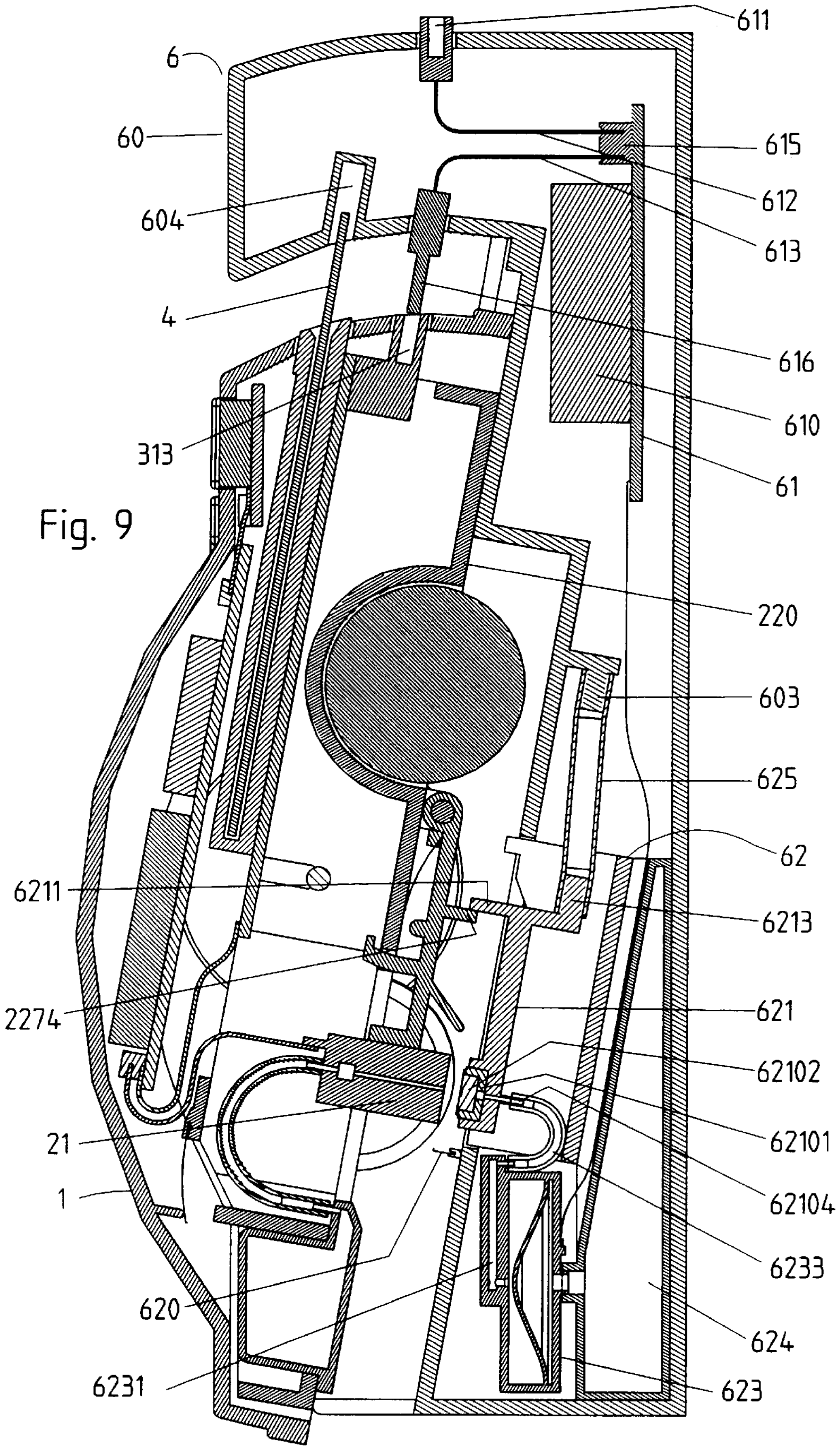
FIG. 9 is a longitudinal sectional view through the manual franking machine and the adapter of the invention before mating.

FIG. 9 shows the condition wherein the nose 2274 at the lever 227 of the manual franking machine is coming into engagement with the detent 6211 at the cleaning carriage 621. Given continuation of this motion, the peg 6213 presses against the compression spring 625, the guide hook 6212 of the cleaning carriage 621 slides upwardly on the bevel 62203 at the guide strip 62201, and the charging and control terminal 313 is pushed onto the plug 616. The contacting forces are larger than the restoring force of the compression spring 625, so that the manual franking machine remains stable in this position, particularly since the suction forces take effect between the seal 62101 and the nozzle surface. Another solution would be possible on the basis of an additional catch connection.

Figure 10:
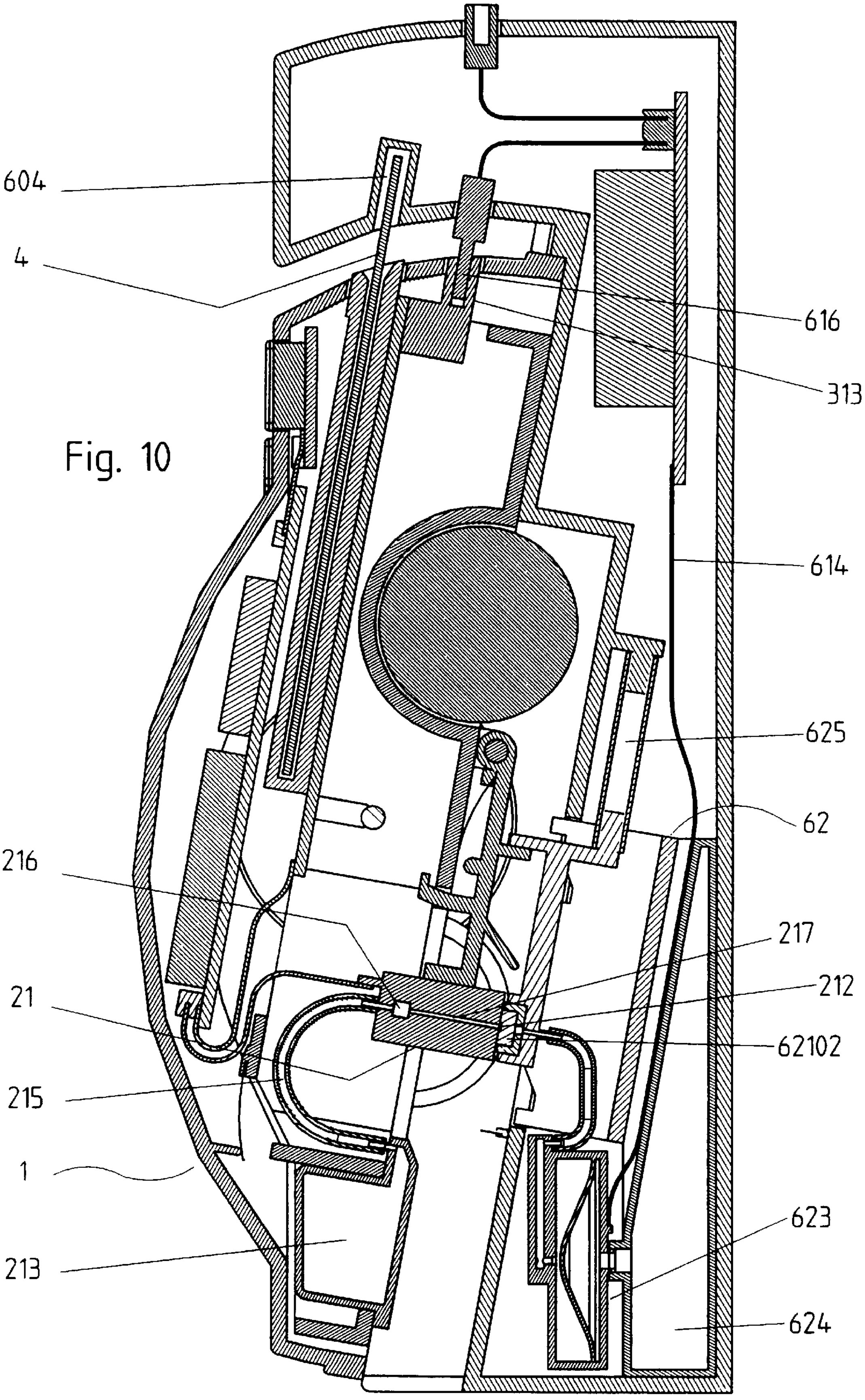
FIG. 10 is a longitudinal section through the manual franking machine and the adapter of the invention in their mated condition.
Figure 11:
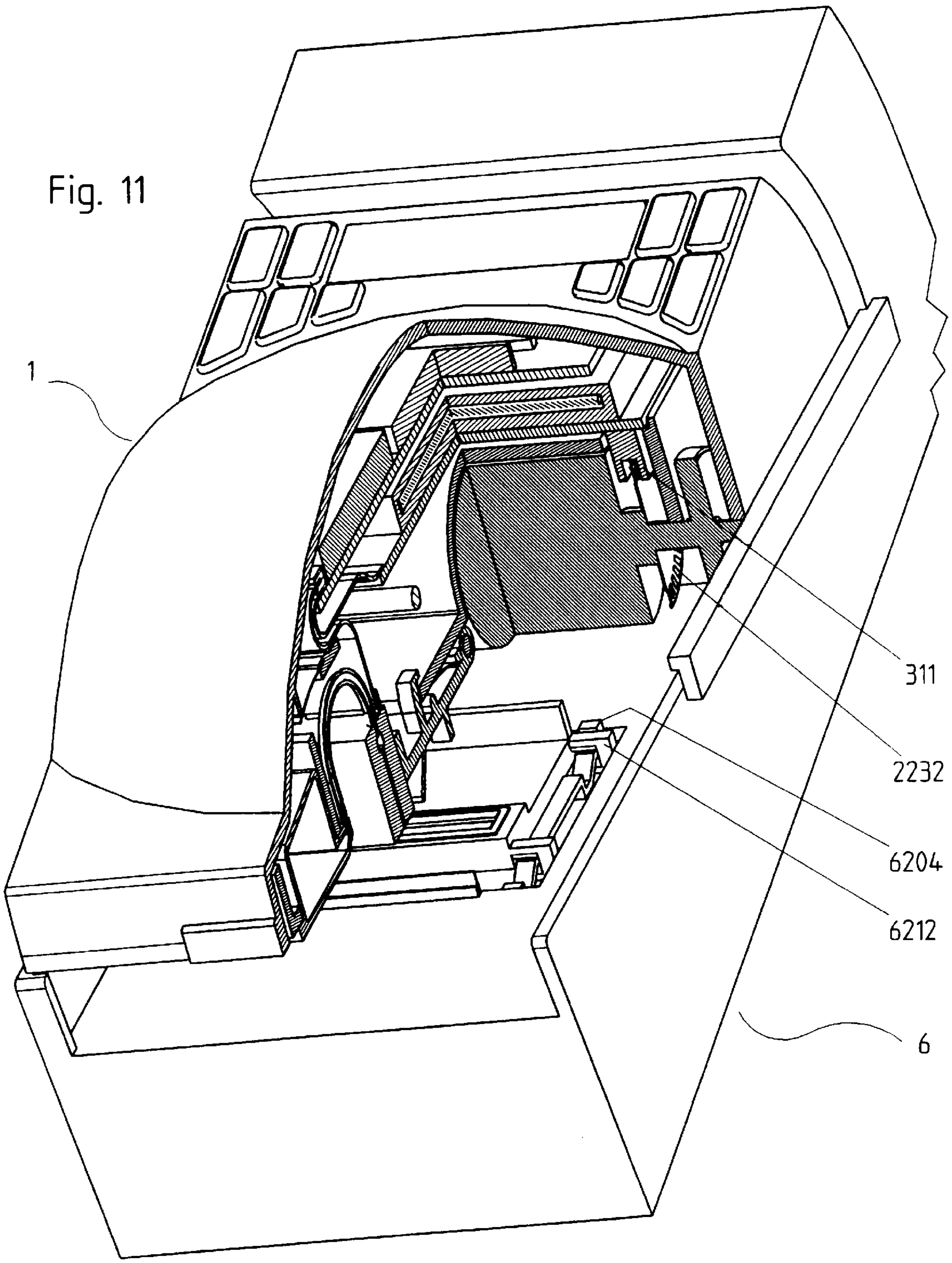
FIG. 11 is a perspective view with an angular section through the manual franking machine according to FIG. 10.

FIGS. 10 and 11 show the relationships between the manual franking machine and the adapter 6 given complete docking. The cleaning carriage 621 thereby lies on the straight part of the guide strip 62201 with its guide hook 6212 and against the limit stops 62204. The seal 62101 of the sealing cap 6210 lies non-positively against the nozzle plane of the ink printer head 21. The charging and control terminal 313 has been pushed completely onto the plug 616. The postage credit card 4 has an outer part projecting into the receptacle 604 of the housing 60.

Insofar as required, the cleaning process can now be initiated. When applicable, ink is sucked from the ink tank 213 via the ink hose 215 into the ink printer head 21 and initially proceeds into the delivery channel 216 therein. From the delivery channel 216, the ink is conducted to the nozzle apertures 212 via ink channels 217 and ink pressure chambers (not shown in detail). The ink that is sprayed out strikes the suction pad 62102, penetrates therethrough and the proceeds via the hose 6233 to the suction pump 623 and into the extraction tank 624 from the suction pump 623.

When the manual franking machine is withdrawn from the adapter 6 after the end of the cleaning and charging procedure, the cleaning carriage 621 slides back to the detents 62202 in the receptacle part 622 as a consequence of the action of the compression spring 625.

Both during insertion and removal of the manual franking machine, the nozzle surface of the ink printer head 21 slides across the wiper lip 620 and is wiped off by this in the fashion of a doctor.

Although modifications and changes may be suggested by those skilled in the art, it is the intention of the inventor to embody within the patent warranted hereon all changes and modifications as reasonably and properly come within the scope of his contribution to the art.

We claim as our invention:

1. An electronic manual postage meter machine comprising:

a first assembly including an ink printer head connected to a replaceable ink tank, and a carriage on which said ink printer head and said ink tank are mounted for moving said ink printer head over a medium onto which an ink imprint is to be printed;

a second assembly containing at least one data entry means for receiving data identifying postage values, electronic control means connected to said data entry means for recrediting dependent on said data and to said ink printer head for controlling said ink printer head to produce said imprint, and a rechargeable battery connected to said control means; and an adapter having a receptacle shaped for receiving said first assembly with said second assembly mounted thereon, said adapter comprising battery charging means, connectable to a mains supply, for making an electrical connection with said rechargeable battery for recharging said rechargeable battery when said first and second assemblies are in said receptacle, cleaning means for cleaning ink from said ink printer head when said first and second assemblies are in said receptacle, and sealing means for producing a sealed volume between said cleaning means and said ink printer head when said first and second assemblies are in said receptacle.

2. An electronic manual postage meter machine as claimed in claim 1 further comprising a housing containing said first and second assemblies, and wherein said carriage comprises a rigid carriage frame having a front axle rotationally seated therein and at least one rear axle mounted therein, at least one first wheel mounted on said front axle and a pair of second wheels mounted on said rear axle, said electronic manual postage meter machine further comprising means for resiliently mounting said carriage frame and said front axle in said housing for permitting pivoting of said carriage frame and said front axle relative to said housing, and wherein said first assembly further includes a lever on which said ink printer head is mounted, and a lever axle mounted in said carriage frame and attached to said lever for permitting pivoting of said lever around said lever axle.

3. An electronic manual postage meter machine as claimed in claim 2 wherein said at least one first wheel comprises a drum, and wherein said second assembly includes an incremental sensor means, connected to said control means, for sensing rotation of said drum as said drum moves over said medium.

4. An electronic manual postage meter machine as claimed in claim 2 wherein said pair of second wheels are inwardly canted in a direction of travel of said ink printer head relative to said medium.

5. An electronic manual postage meter machine as claimed in claim 2 wherein said first assembly includes drive wheels mounted on said front axle on opposite sides of said at least one first wheel mounted on the front axle for co-rotation with said at least one first wheel mounted on the front axle, a pair of driven wheels mounted on said rear axle for co-rotation with said pair of second wheels, and coupling means engaging said drive wheels and said driven wheels for driving said driven wheels relative to said drive wheels with a drive ratio greater than 1.

6. An electronic manual postage meter machine as claimed in claim 5 wherein said pair of second wheels have an outer circumference with a first coefficient of friction and wherein said at least one front wheel has an outer circumference with a second coefficient of friction, said first coefficient of friction being lower than said second coefficient of friction.

7. An electronic manual postage meter machine as claimed in claim 5 wherein said drive wheels are integral with said at least one first wheel, and wherein said driven wheels are integral with said pair of second wheels.

8. An electronic manual postage meter machine as claimed in claim 5 wherein said coupling means comprises coupling wheels, and wherein each of said drive wheels, said coupling wheels, and said driven wheels comprise a gear wheel.

9. An electronic manual postage meter machine as claimed in claim 5 wherein said coupling means comprises an axle rotationally mounted in said carriage frame, and coupling wheels rigidly mounted on said axle.

10. An electronic manual postage meter machine as claimed in claim 2 further comprising a centrifugal brake having a centrifugal brake mounted on said front axle and having a brake housing, comprising a brake cylinder, which is rigidly mounted to said carriage frame.

11. An electronic manual postage meter machine as claimed in claim 2 wherein said means for resiliently mounting comprises a stop element in said housing a spring secured to said carriage frame pressing under tension against said stop element.

12. An electronic manual postage meter machine as claimed in claim 2 wherein said ink printer head comprises a plurality of ink nozzles, and further comprising a spring attached to said lever, said spring pressing under tension against said carriage frame, two stop elements carried on said lever for limiting a pivoting range of said lever, and a spacer attached to said lever for maintaining a substantially constant spacing between said ink nozzles and said medium.

13. An electronic manual postage meter machine as claimed in claim 1 wherein said cleaning means comprises a wiper lip mounted to said adapter for projecting into said receptacle for engaging said ink printer head when said first and second assemblies are in said receptacle, a cleaning carriage and means for resiliently mounting said clearing carriage in said receptacle to press against said ink printer head when said first and second assemblies are in said receptacle, a sealing cap carried on said cleaning carriage having a resilient seal element which surrounds a row of nozzles on said ink printer head when said first and second assemblies are in said receptacle for producing said sealed volume, a suction pump in communication with said sealed volume and connected to an ink extraction tank, said suction pump withdrawing ink from said nozzles and into said extraction tank.

14. An electronic manual postage meter machine as claimed in claim 13 wherein said carriage comprises a rigid carrier frame, and wherein said first assembly further includes a lever on which said ink printer head is mounted, and a lever axle, mounted in said carriage frame, and attached to said lever around which said lever is pivotable, and wherein said adapter has an adapter housing, in which said receptacle is disposed, said adapter housing having first and second sidewalls respectively disposed at opposite sides of said receptacle and each sidewall having a guide rail attached thereto for guiding and accepting said first and second assemblies into said receptacle, and said lever having a projection extending therefrom below said first assembly, wherein said means for resiliently mounting said cleaning carriage in said adapter comprises a compression spring permitting movement of said cleaning carriage relative to said adapter housing along a height and a length of said adapter housing, and said cleaning carriage having a stop element thereon, engageable with said projection from said lever, for positioning said cleaning carriage in mating relationship with said ink printer head when said first and second assemblies are disposed in said receptacle.

15. An electronic manual postage meter machine as claimed in claim 14 wherein said adapter housing has an adapter housing peg and wherein said cleaning carriage has a cleaning carriage peg, said compression spring being mounted on and extending between said adapter housing peg and said cleaning carriage peg.

16. An electronic manual postage meter machine as claimed in claim 1 wherein said adapter further comprises an exterior terminal socket connectable to said mains supply.

17. An electronic manual postage meter machine as claimed in claim 1 wherein said battery charging means comprises a plug, and wherein said first assembly further includes a plug receptacle which mates with said plug and which is electrically connected to said rechargeable battery.

18. An electronic manual postage meter machine as claimed in claim 1 wherein said adapter further comprises a modem terminal connectable to a data source, and means for making an electrical connection between said modem terminal and said control means when said first and second assemblies are disposed in said receptacle for transferring data between said data source and said control means.

19. An electronic manual postage meter machine as claimed in claim 1 wherein said data input means comprise a write/read unit for a postage value credit card.

20. An electronic manual postage meter machine as claimed in claim 1 wherein said control means comprise a microprocessor.

21. An electronic manual postage meter machine as claimed in claim 20 wherein said data input means comprise a write/read unit for a postage value credit card, and wherein said electronic manual postage meter machine further comprises electrical conductor means respectively connecting said microprocessor to said read/write unit and electrical conductor means connecting said microprocessor to said ink printer head.

* * * * *